(12) United States Patent
Frayne

(10) Patent No.: US 8,432,053 B2
(45) Date of Patent: Apr. 30, 2013

(54) WIND TURBINE SOLAR CONTROL SYSTEM

(76) Inventor: Kevin E. Frayne, San Mateo, CA (US)

( * ) Notice: Subject to any disclaimer, the term of this patent is extended or adjusted under 35 U.S.C. 154(b) by 322 days.

(21) Appl. No.: 12/814,830

(22) Filed: Jun. 14, 2010

(65) Prior Publication Data

US 2010/0314876 A1    Dec. 16, 2010

Related U.S. Application Data

(60) Provisional application No. 61/186,973, filed on Jun. 15, 2009.

(51) Int. Cl.
*F03D 9/00* (2006.01)
*H02P 9/04* (2006.01)

(52) U.S. Cl.
USPC .............................. 290/44; 290/55

(58) Field of Classification Search .................... 290/44, 290/55
See application file for complete search history.

(56) References Cited

U.S. PATENT DOCUMENTS

| | | | | |
|---|---|---|---|---|
| 4,119,863 | A | 10/1978 | Kelly | 290/55 |
| 4,200,904 | A * | 4/1980 | Doan | 362/183 |
| 5,075,564 | A * | 12/1991 | Hickey | 290/55 |
| 5,254,876 | A | 10/1993 | Hickey | 290/55 |
| 6,661,113 | B1 * | 12/2003 | Bonin | 290/55 |
| 6,933,625 | B2 | 8/2005 | Feddersen et al. | 290/44 |
| 7,045,702 | B2 | 5/2006 | Kashyap | 136/244 |
| 7,105,940 | B2 * | 9/2006 | Weesner et al. | 290/44 |
| 7,321,173 | B2 * | 1/2008 | Mann | 290/55 |
| 7,345,374 | B1 | 3/2008 | Jones et al. | 290/44 |
| 7,434,636 | B2 * | 10/2008 | Sutherland | 180/2.2 |
| 7,453,167 | B2 | 11/2008 | Gilbert | 290/55 |
| D595,885 | S * | 7/2009 | Daidone et al. | D26/69 |
| 7,638,891 | B2 * | 12/2009 | Fein et al. | 290/43 |
| D610,732 | S * | 2/2010 | Daidone et al. | D26/71 |
| D626,686 | S * | 11/2010 | Daidone et al. | D26/155 |
| 7,851,935 | B2 * | 12/2010 | Tsao | 290/44 |
| 7,964,981 | B2 * | 6/2011 | Tsao | 290/44 |
| 8,288,884 | B1 * | 10/2012 | Malcolm | 290/55 |
| 2005/0218657 | A1 * | 10/2005 | Weesner et al. | 290/55 |
| 2006/0137348 | A1 * | 6/2006 | Pas | 60/641.1 |
| 2006/0213697 | A1 * | 9/2006 | Sutherland | 180/2.2 |
| 2007/0090653 | A1 * | 4/2007 | Martelon | 290/55 |
| 2008/0037243 | A1 * | 2/2008 | Discoe et al. | 362/183 |
| 2008/0196758 | A1 * | 8/2008 | McGuire | 136/245 |
| 2009/0128085 | A1 * | 5/2009 | Yang | 320/101 |
| 2009/0186745 | A1 * | 7/2009 | Lewiston | 482/2 |
| 2009/0273922 | A1 * | 11/2009 | Ho et al. | 362/183 |
| 2010/0090605 | A1 * | 4/2010 | Nevins | 315/159 |
| 2010/0107633 | A1 * | 5/2010 | Tsao | 60/641.8 |
| 2010/0117372 | A1 * | 5/2010 | McMaster | 290/55 |
| 2010/0133820 | A1 * | 6/2010 | Tsao | 290/44 |
| 2010/0133850 | A1 * | 6/2010 | Winkler | 290/55 |
| 2010/0207453 | A1 * | 8/2010 | Ottman | 307/72 |
| 2011/0133454 | A1 * | 6/2011 | Vo | 290/44 |

(Continued)

*Primary Examiner* — Pedro J Cuevas
(74) *Attorney, Agent, or Firm* — James Ray & Assoc

(57) ABSTRACT

The present invention is a wind turbine solar control system. This system may be applied to various types of wind turbines that use a start-up motor or will be able to be turned efficiently using a sun powered motor. A rechargeable battery is used to hold enough power to start the propeller for a predetermined amount of time. Wind sensors will be included to determine if enough wind is present to turn the propeller on. A control box may be included to designate when to turn the motor on and off. It also controls how much to charge the battery and regulates when to stop charging.

14 Claims, 5 Drawing Sheets

U.S. PATENT DOCUMENTS

| | | | |
|---|---|---|---|
| 2011/0204644 A1* | 8/2011 | Perregrini | 290/53 |
| 2011/0221203 A1* | 9/2011 | Miller | 290/55 |
| 2012/0026320 A1* | 2/2012 | Bryceland et al. | 348/135 |
| 2012/0112546 A1* | 5/2012 | Culver | 307/66 |
| 2012/0187698 A1* | 7/2012 | Bassett | 290/55 |
| 2012/0235410 A1* | 9/2012 | Serrano | 290/50 |
| 2012/0273069 A1* | 11/2012 | Klicpera et al. | 137/551 |

\* cited by examiner

WIND TURBINE SOLAR CONTROL SYSTEM

CROSS REFERENCE TO RELATED APPLICATION

This patent application is related to and claims priority from U.S. Provisional Patent Application Ser. No. 61/186,973 filed Jun. 15, 2009.

FIELD OF THE INVENTION

This invention generally pertains to wind turbines. More specifically, the present invention relates to a control system for efficiently and reliably starting and controlling wind turbines.

BACKGROUND OF THE INVENTION

The invention is particularly applicable to wind turbines and will be described in related to such turbines. However, it will be appreciated by those skilled in the art that the invention has broader applications and may also be adapted for use in other power systems.

Wind turbines are designed to use wind power to generate electricity. Currently, wind turbine propellers are started by electric motors. It is not energy efficient to use electricity when trying to make natural energy. The motors have a tendency to break, which renders the entire wind turbine useless. Many wind turbines are sitting idle, due to broken motors. Repairing them can be costly. These motors also need to be operated manually. This reduces the amount of time the wind turbines can be in operation. With an automatic start-up, wind turbines could run more often, producing more energy.

Accordingly, it has been considered desirable to develop a new and improved wind turbine system which would overcome the foregoing difficulties and others while providing better and more advantageous overall results.

SUMMARY OF THE INVENTION

The present invention is a wind turbine solar control system. This system may be applied to various types of wind turbines that use a start-up motor or will be able to be turned efficiently using a sun powered motor. The solar panel may be rectangular in shape and may shadow the wind turbine base. Other embodiments of wind turbines may employ a solar panel of a different shape. A rechargeable battery is used to hold enough power to start the propeller for a predetermined amount of time. Wind sensors will be included to determine if enough wind is present to turn the propeller on. A control box may be included to designate when to turn the motor on and off. It also controls how much to charge the battery and regulates when to stop charging. Several braces may hold the panel to the wind turbine. The system will use the sun to supply energy to the motor. The electric capabilities of the motor may be left in place as a back-up system.

The present invention provides reusable energy to the motor of a wind turbine propeller. Using this solar system, wind turbines are able to run more efficiently, while reducing or eliminating the use of electricity. The solar system also makes the start-up of the motor automatic, allowing the wind turbine to operate more continuously, generating more energy. This concept can be applied to all wind turbine propellers that are run on an electric motor. The system would use sun and wind power to more efficiently generate electricity. The system could be set up so that each wind turbine has a dedicated solar panel, battery and control system. However, the system could be designed to share certain elements or to share an array of elements. For example, a wind farm comprising a group of wind turbines could share a large array of solar panels that would charge a centralized battery bank, the power of the battery bank could then be supplied to the wind turbines for control and startup. Due to the competency of this system, motor repairs will be infrequent, allowing the wind turbines to run longer and more often. It is envisioned that horizontal axis and vertical axis turbines could both benefit from the present invention.

OBJECTS OF THE INVENTION

It is, therefore, one of the primary objects of the present invention to provide a wind turbine control system that uses renewable energy to charge a back up power supply.

Another object of the present invention is to provide a wind turbine control system that uses renewable energy to charge a battery.

Still another object of the present invention is to provide a wind turbine control system that uses renewable energy to charge a back up power supply for reliable restarts.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention; and together with the description serve to explain the principles and operation of the invention.

Figure 1:
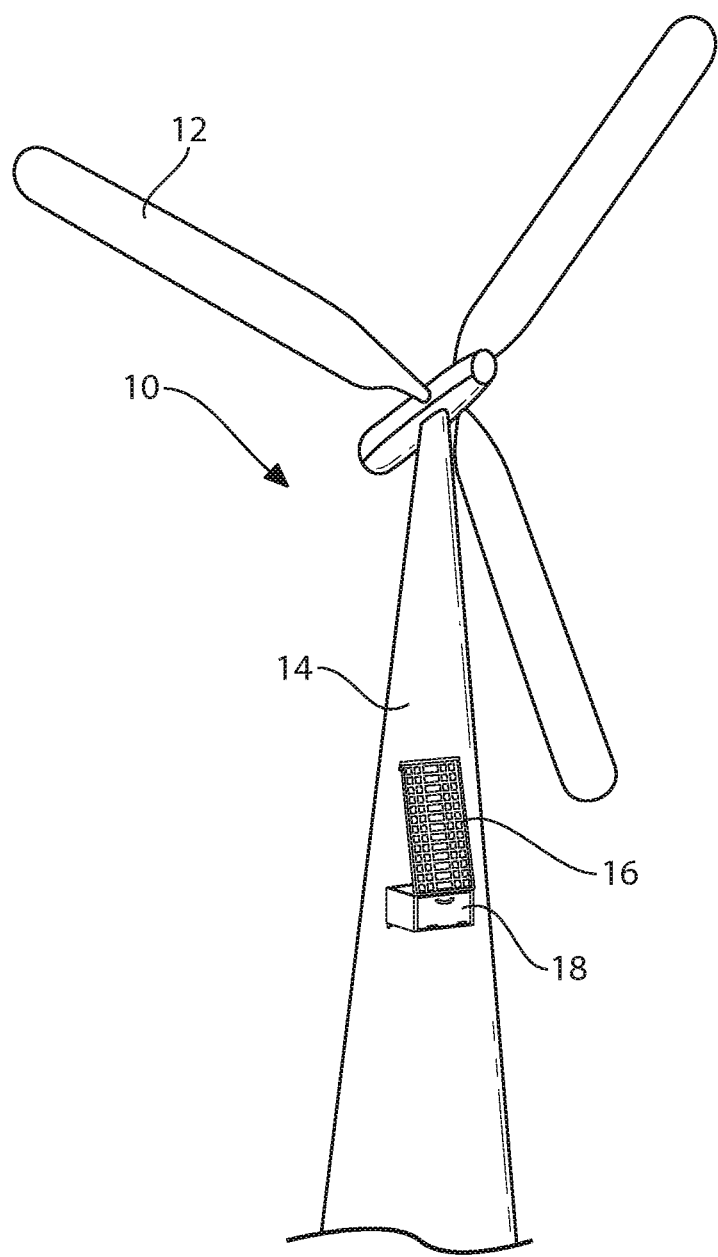
FIG. 1 is a general perspective view of one embodiment of the present invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIG. 1 which is a general perspective view of one embodiment of the present invention. The current embodiment of the present invention is a wind turbine 10 comprising propellers 12 and mast 14. Attached to mast 14 is solar panel 16 and control box 18. Alternatively solar panel 16 could be mounted on a tracking apparatus to allow solar panel 16 to follow the Sun.

Figure 2:
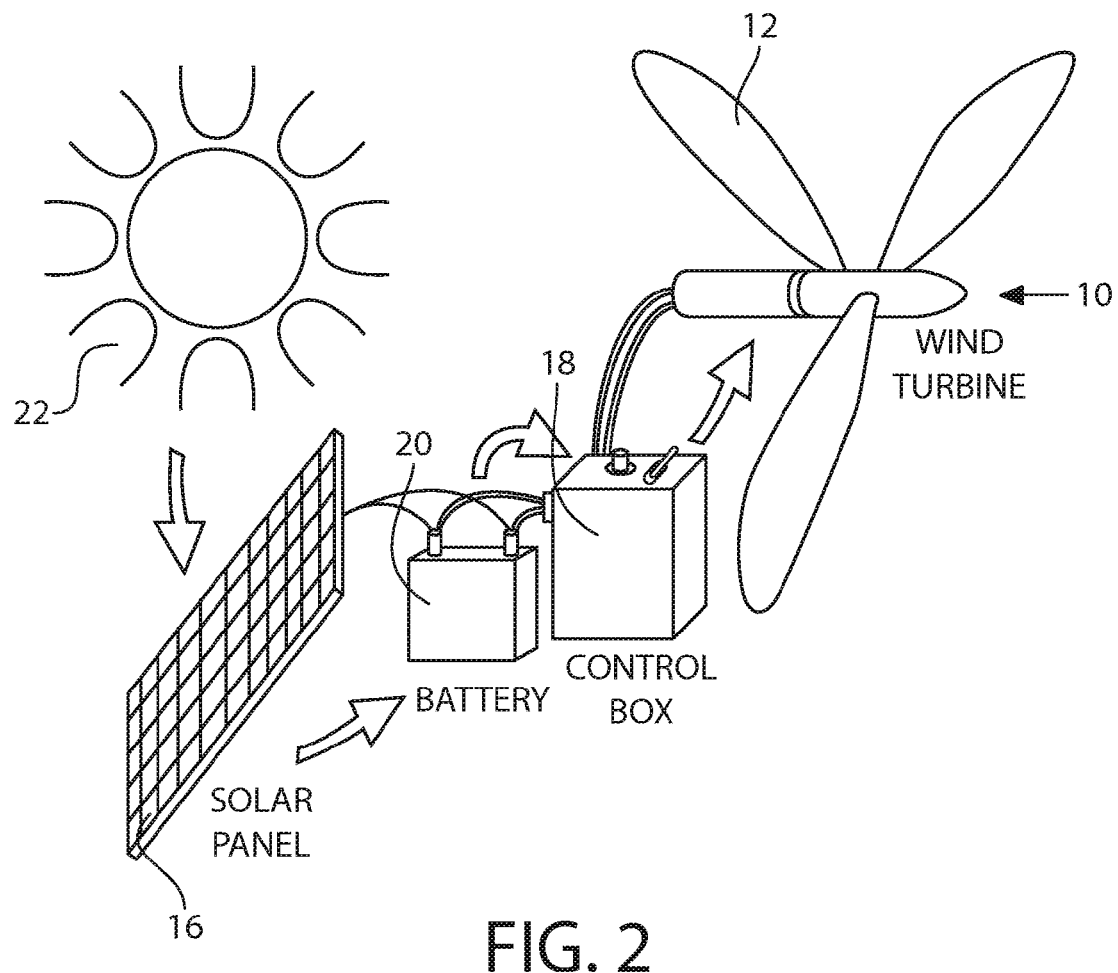
FIG. 2 is a schematic view of one embodiment of the present invention.

Reference is now made, more particularly, to FIG. 2 which is a schematic view of one embodiment of the present invention. Sun 22 radiates energy to solar panel 16. The resulting electrical power from solar panel 16 is transferred for storage to battery 20. Control box 18 controls the distribution of electric power from battery 20 to wind turbine 10. Preferably control box 18 is connected via two way communication with turbine systems, battery systems and solar panel related systems. Preferably control box is capable of controlling numerous systems related to the wind turbine.

Figure 3:
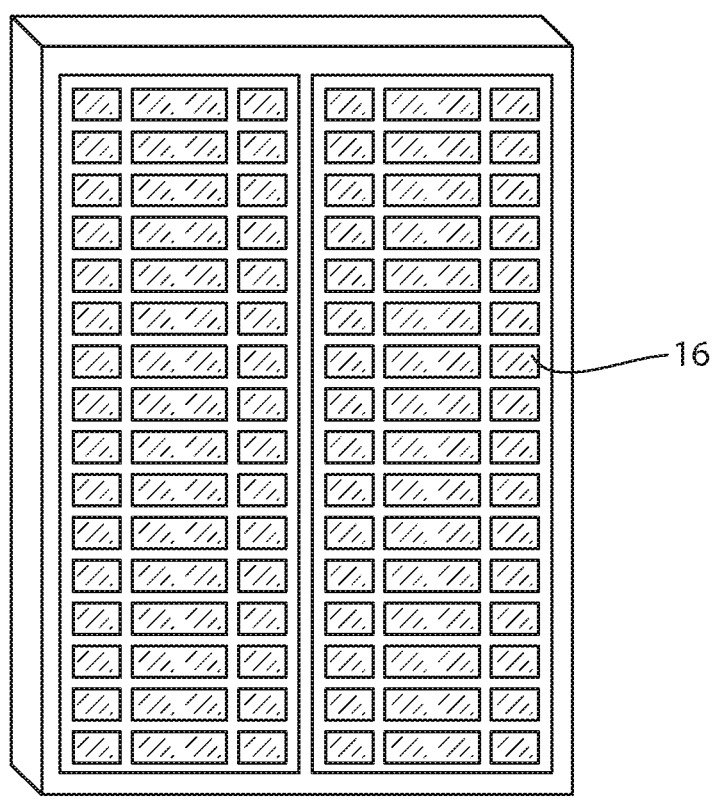
FIG. 3 is a general perspective view of one embodiment of the solar panel of the present invention.

Reference is now made, more particularly, to FIG. 3 which is a general perspective view of one embodiment of the solar panel of the present invention.

Figure 4:
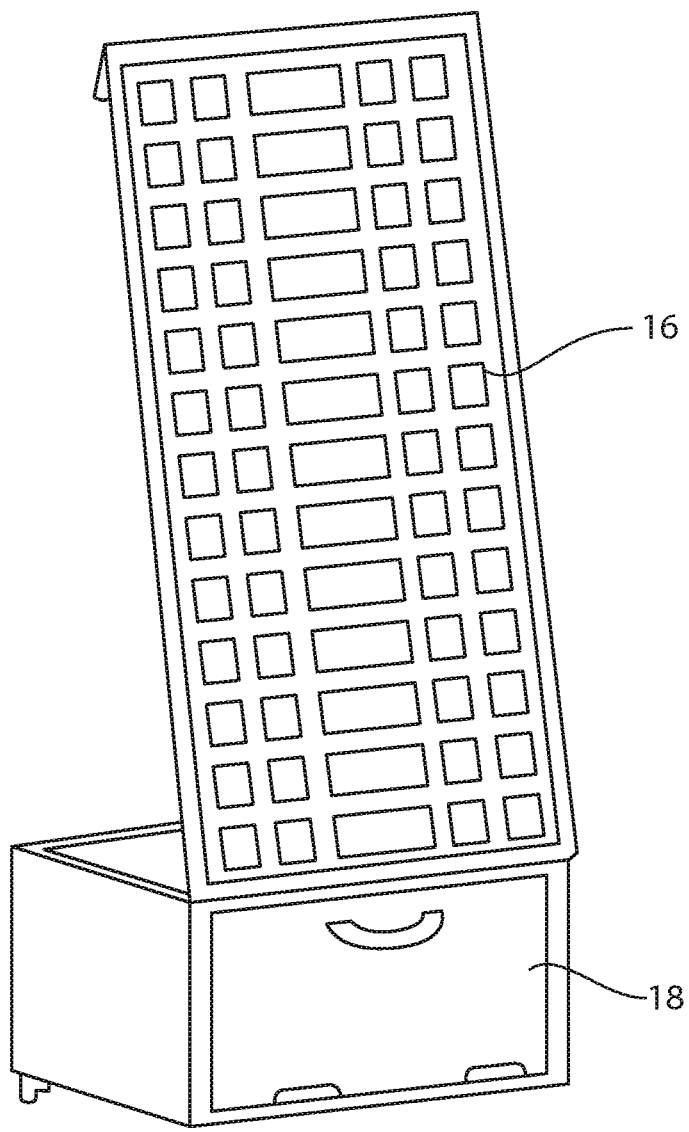
FIG. 4 is a general perspective view of one embodiment of the solar panel and control box of the present invention.
Figure 5:
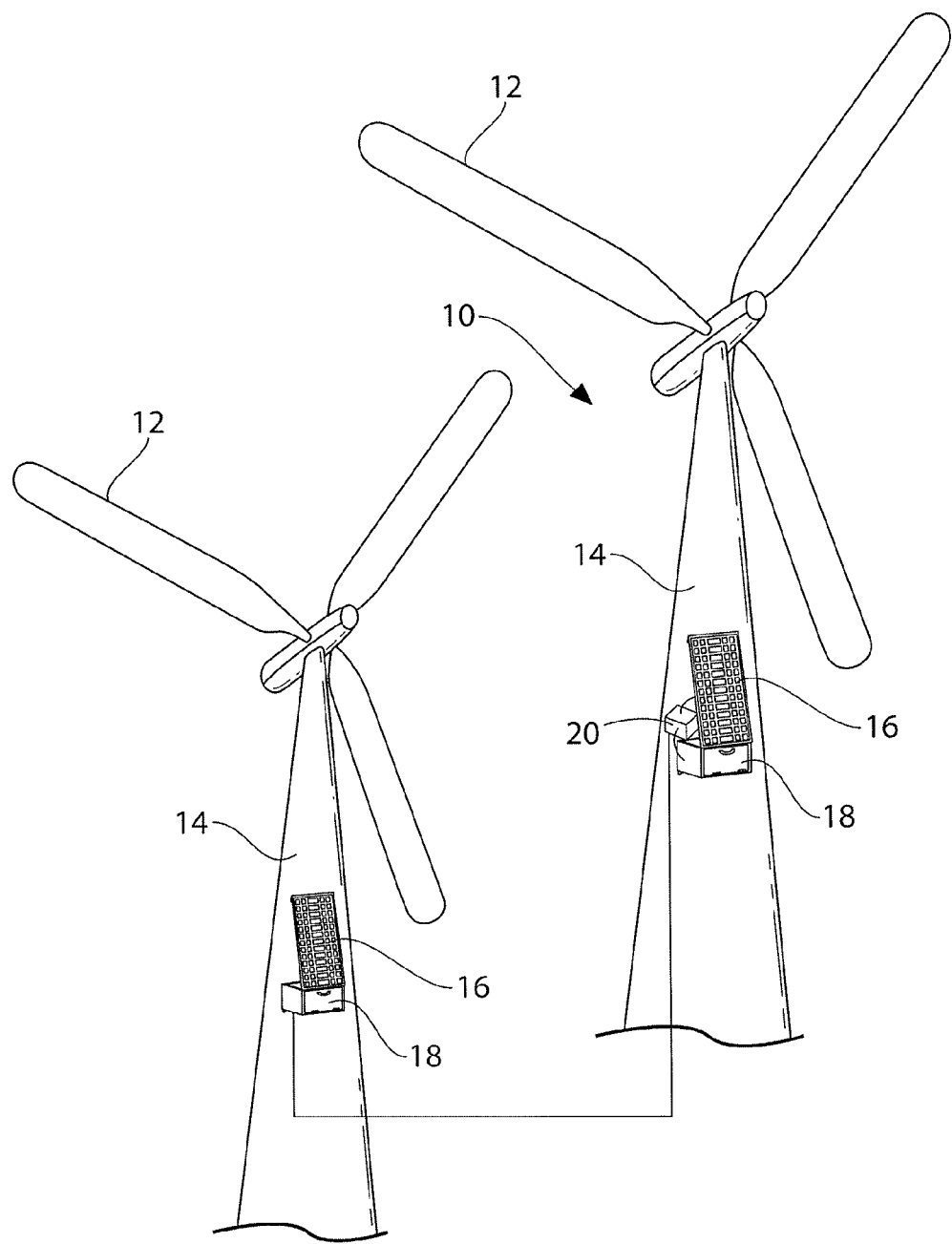
FIG. 5 is a general perspective view showing a pair of wind turbines.

Reference is now made, more particularly, to FIG. 4 which is a general perspective view of one embodiment of the solar panel and control box of the present invention.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

What is claimed is:

1. A wind turbine control system comprising:
   at least one wind turbine,
   at least one control box,
   at least one photovoltaic panel, and
   at least one battery in electrical communication with said control box and said photovoltaic panel and in further electrical communication with a motor of said at least one wind turbine, said at least one battery is responsive to said control box and said at least one photovoltaic panel to provide power to said motor of said at least one wind turbine for control and startup.

2. The system of claim 1, wherein said at least one battery comprises at least one rechargeable battery.

3. The system of claim 1, wherein said at least one photovoltaic panel is configured to charge said at least one battery.

4. The system of claim 1, wherein said at least one photovoltaic panel is mounted directly on said control box.

5. A wind farm control system comprising:
   at least two wind turbines,
   at least two photovoltaic panels,
   at least one control box, and
   a centralized rechargeable battery bank in electrical communication with motors of said at least two wind turbines, at least two photovoltaic panels and at least one control box, said centralized rechargeable battery bank is responsive to said at least one control box and said at least two photovoltaic panels to provide power to said motors of said at least two wind turbines for control and startup.

6. The system of claim 5, wherein said at least two photovoltaic panels are mounted on at least one mast of said at least two wind turbines.

7. The system of claim 5, wherein said at least two photovoltaic panels are mounted on at least one mast of said at least two wind turbines, and said at least one control box is mounted on at least one mast of said at least two wind turbines.

8. The system of claim 5, wherein said centralized rechargeable battery bank provides power to said at least one control box.

9. The system of claim 5, wherein said centralized rechargeable battery bank provides back up power to said at least one control box.

10. The system of claim 5, wherein said centralized rechargeable battery bank provides back up power to said at least two wind turbines.

11. The system of claim 5, wherein said centralized rechargeable battery bank provides start up power to said at least two wind turbines.

12. The system of claim 1, wherein said at least one turbine includes a vertically disposed mast and wherein said control box is attached to an exterior surface of said mast.

13. The system of claim 1, wherein said at least one photovoltaic panel is configured to charge said at least one battery and wherein said control box is configured to control starting and stopping charging effort.

14. A method of controlling operation of at least one wind turbine, said method comprising the steps of:
   (a) providing at least one photovoltaic panel, at least one control box and at least one battery in electrical communication with each other
   (b) electrically coupling said at least one battery with a motor of said at least one wind turbine;
   (c) using solar energy to charge said at least one battery; and
   (d) using charge from said at least one battery for control and startup of said motor.

* * * * *